United States Patent
Han et al.

(10) Patent No.: US 6,596,468 B1
(45) Date of Patent: Jul. 22, 2003

(54) PROCESS TO FORM A FLUX CONCENTRATION STITCHED WRITE HEAD

(75) Inventors: Cherng-Chyi Han, San Jose, CA (US); Mao-Min Chen, San Jose, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 138 days.

(21) Appl. No.: 09/659,790

(22) Filed: Sep. 11, 2000

(51) Int. Cl.[7] .................................................. G03C 5/56
(52) U.S. Cl. ........................ 430/315; 430/312; 430/313; 430/314; 430/319; 430/322; 430/323
(58) Field of Search .................................. 430/312–323

(56) References Cited

U.S. PATENT DOCUMENTS

| | | | |
|---|---|---|---|
| 5,282,308 A | 2/1994 | Chen et al. ............... 29/603 |
| 5,325,254 A | 6/1994 | Cooperrider ............... 360/126 |
| 5,617,277 A | * 4/1997 | Chen et al. ............... 360/126 |
| 5,805,391 A | 9/1998 | Chang et al. ............. 360/113 |
| 6,303,260 B1 | * 10/2001 | Hurditch et al. ........... 430/166 |
| 6,320,725 B1 | * 11/2001 | Payne et al. .............. 360/125 |

* cited by examiner

*Primary Examiner*—Mark F. Huff
*Assistant Examiner*—Daborah Chacko-Davis
(74) *Attorney, Agent, or Firm*—George O. Saile; Stephen B. Ackerman

(57) ABSTRACT

A general process for filling a trench is described with particular emphasis on the formation of step P1 during the manufacture of a magnetic write head. The main feature of this process is that a liftoff mask is used for both the trench formation and the filling processes. As a result of this approach, the area surrounding the trench is not disturbed, the trench depth is not reduced, and the original overall planarity, prior to etching and filling, is maintained.

20 Claims, 2 Drawing Sheets

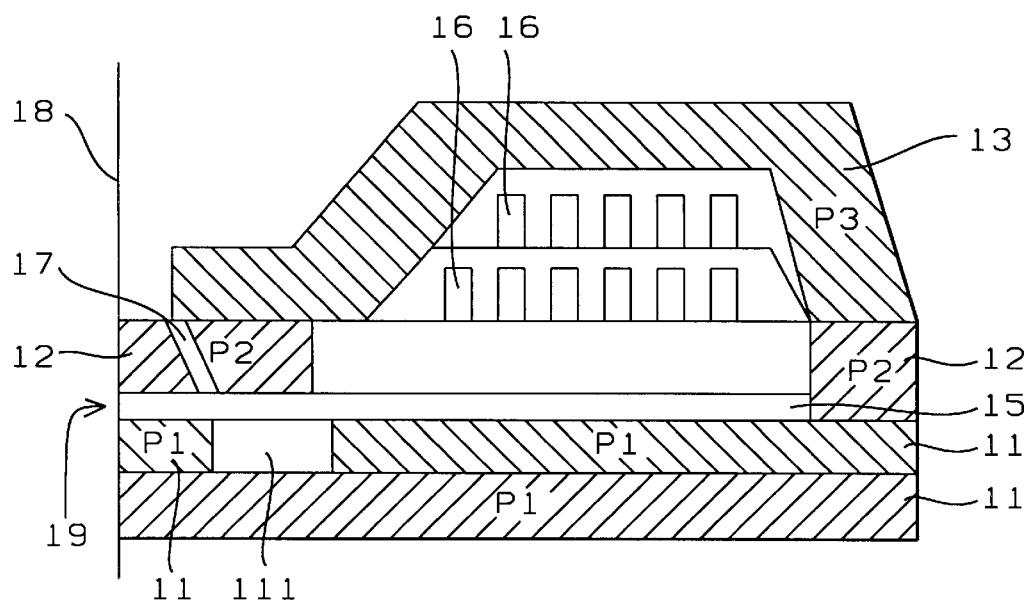
FIG. 1
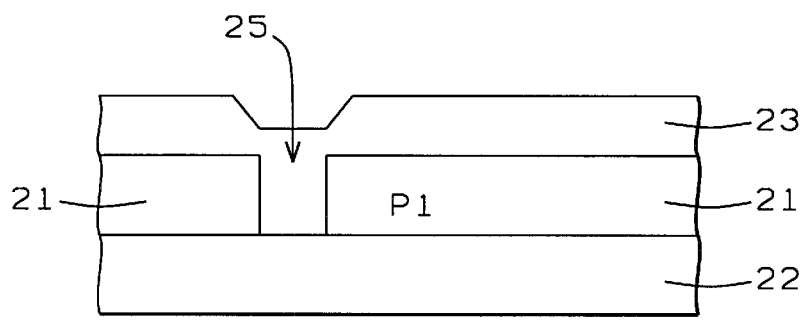
FIG. 2 – Prior Art
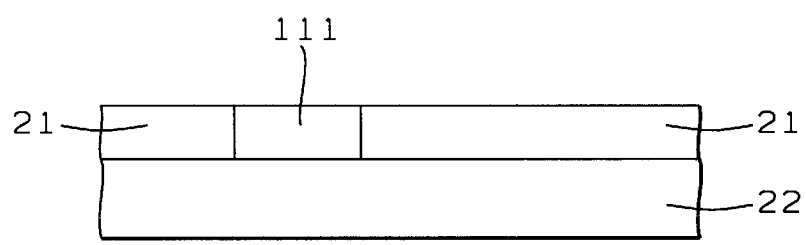
FIG. 3 – Prior Art

PROCESS TO FORM A FLUX CONCENTRATION STITCHED WRITE HEAD

FIELD OF THE INVENTION

The invention relates to the general field of magnetic disk systems with particular reference to forming step P1.

BACKGROUND OF THE INVENTION

Read-write heads for magnetic disk systems have undergone substantial development during the last few years. In particular, older systems in which a single device was used for both reading and writing, have given way to configurations in which the two functions are performed by different structures that have been integrated into a single unit. In FIG. 1 we show a schematic representation of a write head of a type currently under development in our laboratories. The magnetic field that 'writes' a bit at the surface of recording medium 18 (generally referred to as the air bearing surface or ABS) is generated by a flat coil, whose windings, such as 16, can be seen in the figure. The magnetic flux generated by the flat coil is largely confined to the pole pieces. These comprise the upper pole pieces 12 and 13 (known as P2 and P3 respectively), which are connected on the right side of the figure to lower pole piece 11, known as P1. On the left side of the figure, P1 and P2 are seen to be separated by a layer of non-magnetic material 15 so that most of the magnetic flux generated by the flat coil passes across gap 19 where fringing fields extending out for a short distance are still powerful enough to magnetize a small portion of recoding medium 18

It can be seen that where P1 and P2 face each other their cross-sectional areas have been reduced so as to further concentrate the magnetic flux at 19. In the case of P1 this has been achieved by the introduction of an area of non-magnetic material 111, generally referred to as step P1. In FIG. 2 we illustrate the prior art process that has been used till now to form step P1. Given substrate 22 on which layer 21 (P1) rests, a trench 25 was formed in P1 and then overfilled with non-magnetic material 23. Excess material 23 was then removed by means of chemical-mechanical polishing (CMP) so that the trench ended up being just filled as 111, thereby forming step P1 as shown in FIG. 3.

In the interests of product reproducibility, it is important that the thickness of step P1 be closely controlled and that the entire surface of layer 21 be uniformly planar. If it is not, any unevenness in the topology will be transmitted to subsequent layers, including the lower portions of P2. Furthermore, as write heads continue to shrink, so will the thickness of step P1, making control ever more difficult.

While being an extremely useful tool for planarizing surfaces that are made up of several different materials, CMP is subject to problems of dishing at heterogeneous interfaces and, additionally, it is usually necessary to over-polish in order to achieve full planarization. The extent of this over-polish is difficult to control, making the final thickness of 111 likewise difficult to control.

The present invention is directed towards solving the problem of how to form step P1 with tight control of thickness and no loss of planarity to the upper surface of P1

A routine search of the prior art was performed. The following references of interest were found: In U.S. Pat. No. 5,805,391, Chang et al. show a stitched head process by IBM while in U.S. Pat. No. 5,282,308, Chen et al. (also IBM) disclose a stitched head planarization process. In U.S. Pat. No. 5,325,254, Cooperrider shows a thin film inductive transducer having improved yoke and pole tip structure.

SUMMARY OF THE INVENTION

It has been an object of the present invention to provide a process for filling a trench without disturbing the surrounding surface.

Another object of the invention has been to provide a process for forming step P1 in a read head.

A further object has been that said process provide better process tolerance than CMP.

These objects have been achieved by using a liftoff mask for both the trench formation and the filling processes. As a result of this approach, the area surrounding the trench is not disturbed, the trench depth is not reduced, and the original overall planarity, prior to etching and filling, is maintained.

BRIEF DESCRIPTION OF THE DRAWINGS

FIG. 1 shows a write head of a type currently under investigation.

FIGS. 2 and 3 show the prior art process for forming step P1.

DESCRIPTION OF THE PREFERRED EMBODIMENTS

The process of the present invention will be described in terms of a process for forming step P1 in the P1 portion of a magnetic write head, but it will be understood that the process is more general than this and may, in fact, be used whenever a trench in a given layer is to be filled without disturbing the top surface (adjacent to the trench) of the layer.

Figure 4:
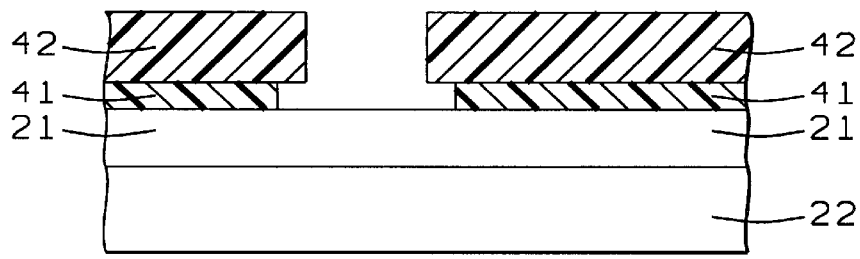
FIG. 4 illustrates the application of a liftoff mask to the structure.

Referring now to FIG. 4, the process of the present invention begins with the provision of a substrate (not shown) on which are deposited two layers, 21 and 22, of magnetic material. These two layers together constitute lower pole piece P1 as discussed earlier. Two different materials, rather than a single uniform layer, are used to facilitate device performance optimization. Layer 21 has a thickness that is between about 0.5 and 3 microns and is CoNiFe, $Ni_{45}Fe_{55}$, or $Ni_{80}Fe_{20}$, while layer 22 has a thickness that is between about 1 and 2 microns and is $Ni_{80}Fe_{20}$.

A liftoff mask is then formed on the surface of 21. This consists of a lower layer 41 made of a material that, like photoresist, is light sensitive and can be patterned through exposure to a suitable pattern and then developed, but, unlike photoresist, is easily removed by etching in a liquid medium. Layer 41 is deposited to a thickness between about 0.04 and 0.9 microns. Any one of several materials such as PMGI (polydimethylglutarimide) could be used. Photoresist layer 42 is then deposited over layer 41 to a thickness between about 0.5 and 2 microns and then both light sensitive layers are simultaneously patterned to form a liftoff mask that defines a trench.

Figure 5:
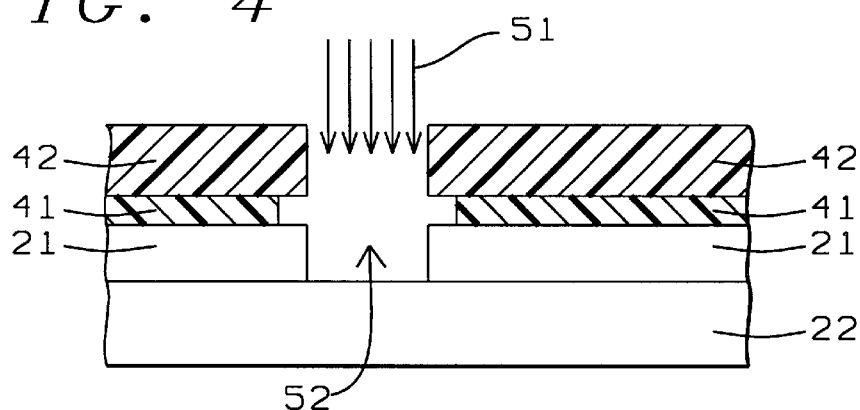
FIG. 5 illustrates the formation of the trench.

Using said liftoff mask, as shown in FIG. 5, trench 52 is formed by etching layer 21 down as far as the interface with layer 22. Our preferred etch method has been ion beam etching because the materials in question are not subject to attack by reactive chlorides or fluorides. Ion beam etching was performed under the following conditions—beam 51 of argon ions, at a power level of about 250 watts with ion energies of about 250 volts, but the process would still be viable, in the general case, if other forms of etching such as RIBE (reactive ion beam etching) were used instead.

Figure 6:
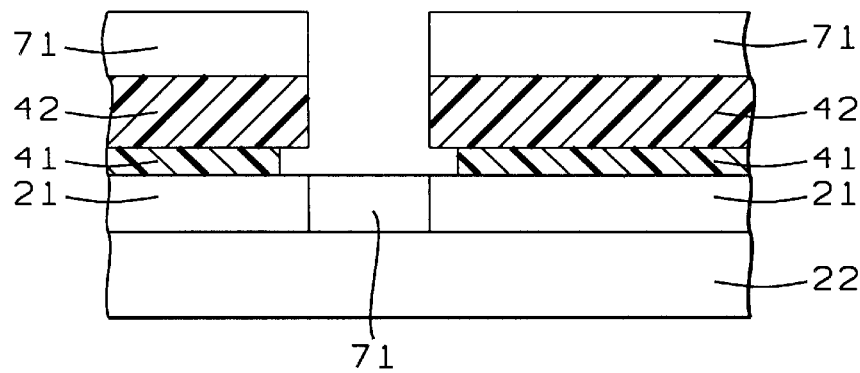
FIG. 6 illustrates the filling of the trench.

Referring now to FIG. 6, with the mask still in place, layer 71 of a non-magnetic material, such as alumina or silica, is then deposited to a thickness that equals the thickness of layer 21. Our preferred method for depositing layer 71 has been sputtering, but other deposition methods, such as ion beam deposition could also have been used. Since the depth of trench 52 can be controlled to ±8% and the thickness of layer 71 can be controlled to ±6%, any over or under filling of the trench will be at most 5%. In practice, trench 52 can be very slightly overfilled, this being followed later by a kiss lap (brief CMP step) to smooth the surface and to remove any slight unevenness at the trench edges.

Figure 7:
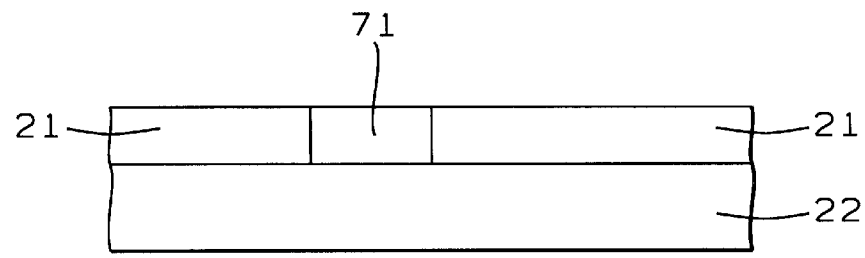
FIG. 7 shows the finished structure.

With trench 52 just filled with layer 71, a suitable etchant is applied to remove light sensitive layer 41. Among possible etchants that may be used we include NMP (N-methylpyrrolidone) and acetone. This causes photoresist layer 42 to be lifted off together with all of layer 71 other than what is in the trench, resulting in the formation of step P1 71 as shown in FIG. 7. A key feature of the process is thus that, in addition to the trench being uniformly filled, the surrounding material, notably layer 21, is not disturbed by the filling process.

While the invention has been particularly shown and described with reference to the preferred embodiments thereof, it will be understood by those skilled in the art that various changes in form and details may be made without departing from the spirit and scope of the invention.

What is claimed is:

1. A process for filling a trench, comprising:
   providing a substrate on which is a layer having an upper surface;
   on said upper surface, depositing a layer of light sensitive material that is easily etched;
   on said light sensitive layer, depositing a layer of photoresist;
   patterning the photoresist and the light sensitive layer to form a liftoff mask that defines the trench;
   using said liftoff mask, forming the trench by etching to a preset depth below the upper surface;
   with the mask still in place, depositing a layer of filler material to a thickness that equals said preset depth; and
   removing the light sensitive layer, thereby lifting off the photoresist layer and all filler material that is on the photoresist layer, whereby said upper surface is not disturbed and said trench depth is unchanged.

2. The process described in claim 1 wherein said layer of light sensitive material is deposited to a thickness between about 0.04 and 0.9 microns.

3. The process described in claim 1 wherein said layer of light sensitive material is PMGI.

4. The process described in claim 1 wherein the layer of photoresist is deposited to a thickness between about 0.5 and 2 microns.

5. The process described in claim 1 wherein the step of forming the trench further comprises ion beam etching or Reactive ion beam etching.

6. The process described in claim 1 wherein said preset trench depth is between about 0.2 and 0.5 microns.

7. The process described in claim 1 wherein the step of depositing a layer of filler material further comprises depositing alumina or silica.

8. The process described in claim 1 wherein the layer of filler material is deposited to a thickness between about 0.3 and 0.55 microns.

9. The process described in claim 1 wherein the step of removing the light sensitive layer further comprises using NMP or acetone.

10. A process for forming a non-magnetic material in a magnetic read head, comprising:
    providing a substrate on which is a first layer of magnetic material and depositing thereon a second layer of magnetic material, said second layer having an upper surface and an as-deposited thickness;
    on said upper surface, depositing a layer of light sensitive material that is easily etched;
    on said light sensitive layer, depositing a layer of photoresist;
    patterning the photoresist and the light sensitive layer to form a liftoff mask that defines a trench;
    using said liftoff mask, forming the trench by etching the second layer of magnetic material down as far as said first layer of magnetic material;
    with the mask still in place, depositing a layer of non-magnetic material to a thickness that equals the thickness of the second layer of magnetic material; and
    removing the light sensitive layer, thereby lifting off the photoresist layer and all non-magnetic material that is on the photoresist layer whereby the non-magnetic layer is formed, said non-magnetic layer has a thickness that is equal to the as-deposited thickness of second magnetic layer.

11. The process described in claim 10 wherein said first layer of magnetic material has a thickness that is between about 1 and 2 microns.

12. The process described in claim 10 wherein said first layer of magnetic material is selected from the group consisting of $Ni_{80}Fe_{20}$.

13. The process described in claim 10 wherein said second layer of magnetic material has a thickness that is between about 0.5 and 3 microns.

14. The process described in claim 10 wherein said second layer of magnetic material is selected from the group consisting of CoNiFe, $Ni_{45}Fe_{55}$, and $Ni_{80}Fe_{20}$.

15. The process described in claim 10 wherein the step of forming the trench further comprises ion beam etching or Reactive ion beam eating.

16. The process described in claim 10 wherein the layer of non-magnetic material is selected from the group consisting of alumina and silica.

17. The process described in claim 10 wherein the step of depositing a layer of non-magnetic material further comprises sputtering or ion beam deposition.

18. The process described in claim 10 wherein said layer of light sensitive material is deposited to a thickness between about 0.04 and 0.9 microns.

19. The process described in claim 10 wherein said layer of light sensitive material is PMGI.

20. The process described in claim 10 wherein the layer of photoresist is deposited to a thickness between about 0.5 and 2 microns.

* * * * *